United States Patent
Hawtof et al.

(10) Patent No.: US 12,011,914 B2
(45) Date of Patent: Jun. 18, 2024

(54) CURVED GLASS CONSTRUCTIONS AND METHODS FOR FORMING SAME

(71) Applicant: CORNING INCORPORATED, Corning, NY (US)

(72) Inventors: Daniel Warren Hawtof, Milton, DE (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/231,545

(22) Filed: Aug. 8, 2023

(65) Prior Publication Data

US 2023/0382083 A1 Nov. 30, 2023

Related U.S. Application Data

(63) Continuation of application No. 17/214,124, filed on Mar. 26, 2021, now Pat. No. 11,772,361.

(60) Provisional application No. 63/004,131, filed on Apr. 2, 2020.

(51) Int. Cl.
  *B32B 7/12* (2006.01)
  *B32B 15/04* (2006.01)
  *C03B 23/023* (2006.01)

(52) U.S. Cl.
  CPC ............... *B32B 7/12* (2013.01); *B32B 15/04* (2013.01); *C03B 23/023* (2013.01); *B32B 2307/732* (2013.01)

(58) Field of Classification Search
  CPC .... B32B 7/04; B32B 7/08; B32B 7/12; B32B 15/04; B32B 17/00; B32B 17/06; B32B 17/061; B32B 17/10
  See application file for complete search history.

(56) References Cited

U.S. PATENT DOCUMENTS

| | | |
|---|---|---|
| 2,068,030 A | 1/1937 | Lieser |
| 2,608,030 A | 8/1952 | Jendrisak |
| 3,197,903 A | 8/1965 | Walley |
| 3,338,696 A | 8/1967 | Dockerty |
| 3,582,456 A | 6/1971 | Stolki |
| 3,682,609 A | 8/1972 | Dockerty |
| 3,753,840 A | 8/1973 | Plumat |
| 3,778,335 A | 12/1973 | Boyd |
| 3,790,430 A | 2/1974 | Mochel |

(Continued)

FOREIGN PATENT DOCUMENTS

| | | |
|---|---|---|
| CN | 1111906 A | 11/1995 |
| CN | 1587132 A | 3/2005 |

(Continued)

OTHER PUBLICATIONS

"Stainless Steel—Grade 410 (UNS S41000)", available online at <https://www.azom.com/article.aspx?ArticleID=970>, Oct. 23, 2001, 5 pages.

(Continued)

*Primary Examiner* — Zachary M Davis
(74) *Attorney, Agent, or Firm* — William M. Johnson; Payal A. Patel

(57) ABSTRACT

The disclosure relates to fame constructions comprising a glass substrate and a curved surface defining at least one curvature, wherein the engagement of the glass substrate with the curved surface imparts a curvature on the glass substrate.

20 Claims, 7 Drawing Sheets

(56) References Cited

U.S. PATENT DOCUMENTS

| | | |
|---|---|---|
| 3,799,817 A | 3/1974 | Laethem |
| 4,147,527 A | 4/1979 | Bystrov et al. |
| 4,238,265 A | 12/1980 | Deminet |
| 4,400,419 A | 8/1983 | Laczynski |
| 4,445,953 A | 5/1984 | Hawk |
| 4,455,338 A | 6/1984 | Henne |
| 4,606,159 A | 8/1986 | Kunert |
| 4,723,386 A | 2/1988 | Sandow |
| 4,802,903 A | 2/1989 | Kuster et al. |
| 4,859,636 A | 8/1989 | Aratani et al. |
| 4,899,507 A | 2/1990 | Mairlot |
| 4,969,966 A | 11/1990 | Norman |
| 4,985,099 A | 1/1991 | Mertens et al. |
| 5,108,480 A | 4/1992 | Sugiyama |
| 5,154,117 A | 10/1992 | Didelot et al. |
| 5,173,102 A | 12/1992 | Weber et al. |
| 5,245,468 A | 9/1993 | Demiryont et al. |
| 5,250,146 A | 10/1993 | Horvath |
| 5,264,058 A | 11/1993 | Hoagland et al. |
| 5,300,184 A | 4/1994 | Masunaga |
| 5,711,119 A | 1/1998 | Cornils et al. |
| 5,897,937 A | 4/1999 | Cornils et al. |
| 6,044,662 A | 4/2000 | Morin |
| 6,086,983 A | 7/2000 | Yoshizawa |
| 6,101,748 A | 8/2000 | Cass et al. |
| 6,242,931 B1 | 6/2001 | Hembree et al. |
| 6,265,054 B1 | 7/2001 | Bravet et al. |
| 6,270,605 B1 | 8/2001 | Doerfler |
| 6,274,219 B1 | 8/2001 | Schuster et al. |
| 6,287,674 B1 | 9/2001 | Verlinden et al. |
| 6,302,985 B1 | 10/2001 | Takahashi et al. |
| 6,332,690 B1 | 12/2001 | Murofushi |
| 6,387,515 B1 | 5/2002 | Joret et al. |
| 6,420,800 B1 | 7/2002 | Levesque et al. |
| 6,426,138 B1 | 7/2002 | Narushima et al. |
| 6,582,799 B1 | 6/2003 | Brown et al. |
| 6,620,365 B1 | 9/2003 | Odoi et al. |
| 6,816,225 B2 | 11/2004 | Colgan et al. |
| 6,903,871 B2 | 6/2005 | Page |
| 7,297,040 B2 | 11/2007 | Chang et al. |
| 7,375,782 B2 | 5/2008 | Yamazaki et al. |
| 7,478,930 B2 | 1/2009 | Choi |
| 7,489,303 B1 | 2/2009 | Pryor |
| 7,542,302 B1 | 6/2009 | Curnalia et al. |
| 7,750,821 B1 | 7/2010 | Taborisskiy et al. |
| 7,955,470 B2 | 6/2011 | Kapp et al. |
| 8,298,431 B2 | 10/2012 | Chwu et al. |
| 8,344,369 B2 | 1/2013 | Yamazaki et al. |
| 8,521,955 B2 | 8/2013 | Arulambalam et al. |
| 8,549,885 B2 | 10/2013 | Dannoux et al. |
| 8,586,492 B2 | 11/2013 | Barefoot et al. |
| 8,619,021 B2 | 12/2013 | Hayton |
| 8,652,978 B2 | 2/2014 | Dejneka et al. |
| 8,692,787 B2 | 4/2014 | Imazeki |
| 8,702,253 B2 | 4/2014 | Lu et al. |
| 8,765,262 B2 | 7/2014 | Gross |
| 8,814,372 B2 | 8/2014 | Vandal et al. |
| 8,833,106 B2 | 9/2014 | Dannoux et al. |
| 8,912,447 B2 | 12/2014 | Leong et al. |
| 8,923,693 B2 | 12/2014 | Yeates |
| 8,962,084 B2 | 2/2015 | Brackley et al. |
| 8,967,834 B2 | 3/2015 | Timmerman et al. |
| 8,969,226 B2 | 3/2015 | Dejneka et al. |
| 8,978,418 B2 | 3/2015 | Balduin et al. |
| 9,007,226 B2 | 4/2015 | Chang |
| 9,061,934 B2 | 6/2015 | Bisson et al. |
| 9,090,501 B2 | 7/2015 | Okahata et al. |
| 9,109,881 B2 | 8/2015 | Roussev et al. |
| 9,140,543 B1 | 9/2015 | Allan et al. |
| 9,156,724 B2 | 10/2015 | Gross |
| 9,223,162 B2 | 12/2015 | Deforest et al. |
| 9,240,437 B2 | 1/2016 | Shieh et al. |
| 9,278,500 B2 | 3/2016 | Filipp |
| 9,278,655 B2 | 3/2016 | Jones et al. |
| 9,290,413 B2 | 3/2016 | Dejneka et al. |
| 9,346,703 B2 | 5/2016 | Bookbinder et al. |
| 9,346,706 B2 | 5/2016 | Bazemore et al. |
| 9,357,638 B2 | 5/2016 | Lee et al. |
| 9,442,028 B2 | 9/2016 | Roussev et al. |
| 9,446,723 B2 | 9/2016 | Stepanski |
| 9,469,561 B2 | 10/2016 | Kladias et al. |
| 9,517,967 B2 | 12/2016 | Dejneka et al. |
| 9,573,843 B2 | 2/2017 | Keegan et al. |
| 9,582,098 B2 | 2/2017 | Rosenberg et al. |
| 9,593,042 B2 | 3/2017 | Hu et al. |
| 9,595,960 B2 | 3/2017 | Wilford |
| 9,606,625 B2 | 3/2017 | Levesque et al. |
| 9,617,180 B2 | 4/2017 | Bookbinder et al. |
| 9,663,396 B2 | 5/2017 | Miyasaka et al. |
| 9,694,570 B2 | 7/2017 | Levasseur et al. |
| 9,700,985 B2 | 7/2017 | Kashima et al. |
| 9,701,564 B2 | 7/2017 | Bookbinder et al. |
| 9,720,450 B2 | 8/2017 | Choi et al. |
| 9,724,727 B2 | 8/2017 | Domey et al. |
| 9,802,485 B2 | 10/2017 | Masuda et al. |
| 9,815,730 B2 | 11/2017 | Marjanovic et al. |
| 9,821,509 B2 | 11/2017 | Kastell |
| 9,895,975 B2 | 2/2018 | Lee et al. |
| 9,902,640 B2 | 2/2018 | Dannoux et al. |
| 9,931,817 B2 | 4/2018 | Rickerl |
| 9,933,820 B2 | 4/2018 | Helot et al. |
| 9,947,882 B2 | 4/2018 | Zhang et al. |
| 9,955,602 B2 | 4/2018 | Wildner et al. |
| 9,957,190 B2 | 5/2018 | Finkeldey et al. |
| 9,963,374 B2 | 5/2018 | Jouanno et al. |
| 9,972,645 B2 | 5/2018 | Kim |
| 9,975,801 B2 | 5/2018 | Maschmeyer et al. |
| 9,992,888 B2 | 6/2018 | Moon et al. |
| 10,005,246 B2 | 6/2018 | Stepanski |
| 10,017,033 B2 | 7/2018 | Fisher et al. |
| 10,042,391 B2 | 8/2018 | Yun et al. |
| 10,074,824 B2 | 9/2018 | Han et al. |
| 10,086,762 B2 | 10/2018 | Uhm |
| 10,131,118 B2 | 11/2018 | Kang et al. |
| 10,140,018 B2 | 11/2018 | Kim et al. |
| 10,153,337 B2 | 12/2018 | Lee et al. |
| 10,175,802 B2 | 1/2019 | Boggs et al. |
| 10,191,199 B2 | 1/2019 | Nichol et al. |
| 10,211,416 B2 | 2/2019 | Jin et al. |
| 10,222,825 B2 | 3/2019 | Wang et al. |
| 10,273,184 B2 | 4/2019 | Garner et al. |
| 10,288,973 B1 | 5/2019 | Gupta et al. |
| 10,303,223 B2 | 5/2019 | Park et al. |
| 10,303,315 B2 | 5/2019 | Jeong et al. |
| 10,326,101 B2 | 6/2019 | Oh et al. |
| 10,328,865 B2 | 6/2019 | Jung |
| 10,343,377 B2 | 7/2019 | Levasseur et al. |
| 10,347,700 B2 | 7/2019 | Yang et al. |
| 10,377,656 B2 | 8/2019 | Dannoux et al. |
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,606,395 B2 | 3/2020 | Boggs et al. |
| 10,649,267 B2 | 5/2020 | Tuan et al. |
| 10,712,850 B2 | 7/2020 | Brandao et al. |
| 10,732,753 B2 | 8/2020 | Boggs et al. |
| 10,788,707 B2 | 9/2020 | Ai et al. |
| 10,976,607 B2 | 4/2021 | Huang et al. |
| 11,006,533 B2 | 5/2021 | Floch et al. |
| 11,016,590 B2 | 5/2021 | Brandao et al. |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0154227 A1 | 8/2004 | Yoshimura |
| 2004/0258929 A1 | 12/2004 | Glaubitt et al. |
| 2005/0091890 A1 | 5/2005 | Snyder |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |

(56) References Cited

U.S. PATENT DOCUMENTS

| | | |
|---|---|---|
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0046240 A1 | 2/2009 | Bolton |
| 2009/0096937 A1 | 4/2009 | Bauer et al. |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2010/0247977 A1 | 9/2010 | Tsuchiya et al. |
| 2011/0057465 A1 | 3/2011 | Beau et al. |
| 2011/0078832 A1 | 3/2011 | Koecher et al. |
| 2011/0148267 A1 | 6/2011 | McDaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0194749 A1 | 8/2013 | Choi et al. |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0175478 A1 | 6/2015 | Ravichandran et al. |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0258750 A1 | 9/2015 | Kang et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | McFarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0188870 A1* | 7/2018 | Boggs .................. B32B 1/00 |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |

(56) References Cited

U.S. PATENT DOCUMENTS

| | | |
|---|---|---|
| 2018/0245125 A1 | 8/2018 | Tsai et al. |
| 2018/0290438 A1 | 10/2018 | Notsu et al. |
| 2018/0304825 A1 | 10/2018 | Mattelet et al. |
| 2018/0314368 A1 | 11/2018 | Isaacson et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0373913 A1 | 12/2018 | Panchawagh et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0247124 A1 | 8/2019 | Sankaran et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0062632 A1 | 2/2020 | Brennan et al. |
| 2020/0064535 A1 | 2/2020 | Haan et al. |
| 2020/0301192 A1 | 9/2020 | Huang et al. |
| 2020/0399161 A1 | 12/2020 | Kumar et al. |
| 2021/0055599 A1 | 2/2021 | Chen et al. |
| 2021/0188685 A1 | 6/2021 | Gahagan et al. |
| 2022/0024179 A1 | 1/2022 | Alonzo et al. |

FOREIGN PATENT DOCUMENTS

| | | |
|---|---|---|
| CN | 1860081 A | 11/2006 |
| CN | 101320182 A | 12/2008 |
| CN | 101496083 A | 7/2009 |
| CN | 101600846 A | 12/2009 |
| CN | 101684032 A | 3/2010 |
| CN | 201989544 U | 9/2011 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 203825589 U | 9/2014 |
| CN | 204111583 U | 1/2015 |
| CN | 104380715 A | 2/2015 |
| CN | 104656999 A | 5/2015 |
| CN | 104679341 A | 6/2015 |
| CN | 204439971 U | 7/2015 |
| CN | 204463066 U | 7/2015 |
| CN | 104843976 A | 8/2015 |
| CN | 105118391 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 202008012502 U1 | 10/2009 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0241355 A1 | 10/1987 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3315467 A2 | 5/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 A | 12/1980 |
| JP | 57-048082 A | 3/1982 |
| JP | 58-073681 A | 5/1983 |
| JP | 58-194751 A | 11/1983 |
| JP | 59-076561 A | 5/1984 |
| JP | 60-222316 A | 11/1985 |
| JP | 63-089317 A | 4/1988 |
| JP | 63-190730 A | 8/1988 |
| JP | 3059337 U | 6/1991 |
| JP | 03-228840 A | 10/1991 |
| JP | 04-119931 A | 4/1992 |
| JP | 05-116972 A | 5/1993 |
| JP | 06-340029 A | 12/1994 |
| JP | 07-257169 A | 10/1995 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |
| JP | 2010-145731 A | 7/2010 |
| JP | 2012-111661 A | 6/2012 |
| JP | 2013-084269 A | 5/2013 |
| JP | 2013-188993 A | 9/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-517380 A | 6/2016 |
| JP | 2016-130810 A | 7/2016 |

(56) References Cited

FOREIGN PATENT DOCUMENTS

| | | |
|---|---|---|
| JP | 2016-144008 A | 8/2016 |
| JP | 5976561 B2 | 8/2016 |
| JP | 2016-173794 A | 9/2016 |
| JP | 2016-530204 A | 9/2016 |
| JP | 2016-203609 A | 12/2016 |
| JP | 2016-207200 A | 12/2016 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201017499 A | 5/2010 |
| TW | 201438895 A | 10/2014 |
| TW | 201546006 A | 12/2015 |
| TW | 201636309 A | 10/2016 |
| TW | 201637857 A | 11/2016 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2004/087590 A2 | 10/2004 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/118293 A1 | 8/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2016/208967 A2 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/129065 A2 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |
| WO | 2020/106413 A1 | 5/2020 |
| WO | 2020/106471 A1 | 5/2020 |
| WO | 2020/112435 A1 | 6/2020 |

OTHER PUBLICATIONS

"Standard Test Method for Measurement of Glass Stress—Optical Coefficient", ASTM International, Designation: C770-16, 2016.

"Standard Test Method for Measurement of Glass Stress-Optical Coefficient", In ASTM standard C770-98, 2013.

Ashley Klamer, "Dead front overlays", Marking Systems, Inc., Jul. 8, 2013, 2 pages.

ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.

ASTM C1422/C1422M-10 "Standard Specification for Chemically Strengthened Flat Glass"; Downloaded Jan. 24, 2018; 5 pages.

ASTM Standard C770-98 (2013), "Standard Test Method for Measurement of Glass Stress-Optical Coefficient".

Author Unknown; "Stress Optics Laboratory Practice Guide" 2012; 11 Pages.

Baillon et al: "An Improved Method for Manufacturing Accurate and Cheap Glass Parabolic Mirrors", Nuclear Instruments & Methods in Physics Research. Section A, Elsevier BV * North-Holland, NL, vol. A276, No. 3, 1988, 13 pages, XP000051982.

Belis et al; "Cold Bending of Laminated Glass Panels"; Heron vol. 52 (2007) No. 1/2; 24 Pages.

Burchardt et al., (Editorial Team), Elastic Bonding: The basic principles of adhesive technology and a guide to its cost-effective use in industry, 2006, 71 pages.

Byun et al; "A Novel Route for Thinning of LCD Glass Substrates"; SID 06 Digest; pp. 1786-1788, v37, 2006.

Datsiou et al., "Behaviour of cold bent glass plates during the shaping process", Engineered Transparency. International Conference atglasstec, Dusseldorf, Germany, Oct. 21 and 22, 2014, 9 pages.

Doyle et al; "Manual on Experimental Stress Analysis"; Fifth Edition, Society for Experimental Mechanics; Unknown Year; 31 Pages.

(56) References Cited

OTHER PUBLICATIONS

Elziere; "Laminated Glass: Dynamic Rupture of Adhesion"; Polymers; Universite Pierre Et Marie Curie—Paris VI, 2016. English; 181 Pages.
Engineering ToolBox, "Coefficients of Linear Thermal Expansion", available online at <https://www.engineeringtoolbox.com/linear-expansion-coefficients-d_95.html>, 2003, 9 pages.
Fauercia "Intuitive HMI for a Smart Life on Board" (2018); 8 Pages http://www.faurecia.com/en/innovation/smart-life-board/intuitive-HMI.
Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles [retrieved on Nov. 23, 2017].
Ferwerda et al., "Perception of sparkle in anti-glare display screens", Journal of the SID, vol. 22, Issue 2, 2014, pp. 129-136.
Fildhuth et al; "Considerations Using Curved, Heat or Cold Bent Glass for Assembling Full Glass Shells", Engineered Transparency, International Conference At Glasstec, Dusseldorf, Germany, Oct. 25 and 26, 2012; 11 Pages.
Fildhuth et al; "Interior Stress Monitoring of Laminated Cold Bent Glass With Fibre Bragg Sensors", Challenging Glass 4 & Cost Action TU0905 Final Conference Louter, Bos & Beus (Eds), 2014; 8 Pages.
Fildhuth et al; "Layout Strategies and Optimisation of Joint Patierns in Full Glass Shells", Challenging Glass 3—Conference on Architectural and Structural Applications of Glass, Bos, Louter, Nijsse, Veer (Eds.), Tu Delft, Jun. 2012; 13 Pages.
Fildhuth et al; "Recovery Behaviour of Laminated Cold Bent Glass—Numerical Analysis and Testing"; Challenging Glass 4 & Cost Action TU0905 Final Conference—Louter, Bos & Beus (Eds) (2014); 9 Pages.
Fildhuth; "Design and Monitoring of Cold Bent Lamination—Stabilised Glass"; ITKE 39 (2015) 270 Pages.
Galuppi et al; "Buckling Phenomena in Double Curved Cold-Bent Glass;" Intl. J. Non-Linear Mechanics 64 (2014) pp. 70-84.
Galuppi et al; "Cold-Lamination-Bending of Glass: Sinusoidal is Better Than Circular" , Composites Part B 79 (2015) 285-300.
Galuppi et al; "Large Deformations and Snap-Through Instability of Cold-Bent Glass"; Challenging Glass 4 & Cost Action TU0905 Final Conference; (2014) pp. 681-689.
Galuppi et al; "Optimal Cold Bending of Laminated Glass"; Internaitonal Journal of Solids and Structures, 67-68 (2015) pp. 231-243.
Galuppi L et al: "Optimal cold bending of laminated glass", Jan. 1, 2007 vol. 52, No. 1/2 Jan. 1, 2007 (Jan. 1, 2007), pp. 123-146.
Gollier et al., "Display Sparkle Measurement and Human Response", SID Symposium Digest of Technical Papers, vol. 44, Issue 1, 2013, pp. 295-297.
Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).
Li et al., "Effective Surface Treatment on the Cover Glass for Autointerior Applications", SID Symposium Digest of Technical Papers, vol. 47, 2016, pp. 467-469.
Millard; "Bending Glass in the Parametric Age"; Enclos; (2015); pp. 1-6; http://www.enclos.com/site-info/news/bending-glass-in-the-parametric-age.
Neugebauer et al; "Let Thin Glass in the Faade Move Thin Glass—New Possibilities for Glass in the Faade", Conference Paper Jun. 2018; 12 pages.
Pambianchi et al; "Corning Incorporated: Designing a New Future With Glass and Optics"; Chapter 1 in "Materials Research for Manufacturing: An Industrial Perspective of Turning Materials Into New Products"; Springer Series Material Science 224, p. 12 (2016).
Pegatron Corp. "Pegaton Navigate the Future"; Ecockpit/Center Cnsole Work Premiere; Automotive World; Downloaded Jul. 12, 2017; 2 Pages.
Photodon, "Screen Protectors For Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).
Product Information Sheet: Coming® Gorilla® Glass 3 with Native Damage Resistance™, Coming Incorporated, 2015, Rev: F_090315, 2 pages.
Scholze, H., "Glass-Water Interactions", Journal of Non-Crystalline Solids vol. 102, Issues 1-3, Jun. 1, 1988, pp. 1-10.
Stattler; "New Wave—Curved Glass Shapes Design"; Glass Magazine; (2013); 2 Pages.
Stiles Custom Metal, Inc., Installation Recommendations, 2010 https://stilesdoors.com/techdata/pdf/Installation%20Recommendations%20HM%20Windows,%20Transoms%20&%>OSidelites%200710.pdf) (Year: 2010).
Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.
Vakar et al; "Cold Bendable, Laminated Glass—New Possibilities in Design"; Structural Engineering International, Feb. 2004 pp. 95-97.
Weijde; "Graduation Plan"; Jan. 2017; 30 pages.
Werner; "Display Materials and Processes," Information Display; May 2015; 8 pages.
Zhixin Wang, Polydimethylsiloxane mechanical properties measured by macroscopic compression and nanoindentation techniques, Graduate Theses and Dissertations, University of South Florida, 2011, 79 pages.

* cited by examiner

CURVED GLASS CONSTRUCTIONS AND METHODS FOR FORMING SAME

CROSS-REFERENCE TO RELATED APPLICATIONS

This application is a continuation of U.S. patent application Ser. No. 17/214,124 filed on Mar. 26, 2021, and claims the benefit of priority under 35 U.S.C § 119 of U.S. Provisional Application Ser. No. 63/004,131 filed on Apr. 2, 2020, the contents of which are relied upon and incorporated herein by reference in their entirety.

BACKGROUND

Methods for producing three-dimensional cold formed objects include adhering a glass component to a rigid frame using an adhesive interlayer to form a glass construction. In such methods, a significant portion of the glass component is mechanically stressed to form the shape, thereby placing shear or tensile stress on the adhesive interlayer for the lifetime of the glass construction, including while the interlayer cures. As soon as the glass component is mechanically stressed or formed, the interface between the glass component and the adhesive interlayer is under tension, shear or a combination of shear and tension. The presence of this tension and/or shear requires that the glass construction be clamped or mechanically restrained for a time sufficient for the adhesive interlayer to provide sufficient tack and substantial creep resistance, adding complexity to a manufacturing process. This time period can range from about five minutes to hours or more, depending on, among other things, the adhesive type and the application. In short, an adhesive that develops tack rapidly and cures quickly is generally required, which can add complexity to manufacturing. And the constant tension may eliminate use of adhesive (e.g., VHB) tapes due to creep. Further still, mechanical restraint of the glass from the edge for the life of the glass construction to keep it from delaminating is generally undesirable from an aesthetic standpoint. Another alternative is to use a combination of VHB tape for initial tack and liquid adhesive for long term adhesion. But such methods may not be scalable to small frame widths, since VHB tape can only be made in strips of 2-3 mm, which would consume a significant portion of the bonding area. Addition of VHB tape also adds complexity in manufacturing.

SUMMARY

Accordingly, there is a need for methods for forming glass constructions that do not succumb to the aforementioned shortcomings of known methods. To that end, the disclosure provides, among other things, a frame construction comprising: a glass substrate having first and second major surfaces and at least one curvature; at least one connector layer including a plurality of mechanical restrains, the connector layer having third and fourth major surfaces; at least one adhesive layer located between the glass substrate second major surface and the connector layer third major surface; and a frame comprising a plurality of mechanical restrain receptacles engaging the plurality of mechanical restrains;
  wherein the frame comprises a curved surface comprising a radius of curvature of about 60 mm or greater;
  wherein the engagement of the plurality of mechanical restrain receptacles and the plurality of mechanical restrains at least initially maintains the at least one curvature of the glass substrate.

The disclosure also relates to a frame construction comprising: a glass substrate having first and second major surfaces and at least one curvature; a segmented frame having first and second opposing major surfaces and including at least one curved segment engaged with at least one substantially flat segment; and at least one adhesive layer located between at least a portion of the glass substrate second major surface and at least a portion of the segmented frame first major surface; wherein the at least one curved segment defines the at least one curvature, the at least one curvature having a bend radius of about 60 mm or greater; wherein the engagement of the at least one curved segment with the at least one substantially flat segment maintains the at least one curvature of the glass substrate.

DESCRIPTION OF THE DRAWINGS

The drawings illustrate generally, by way of example, but not by way of limitation, various embodiments discussed herein.

Figure 1A:
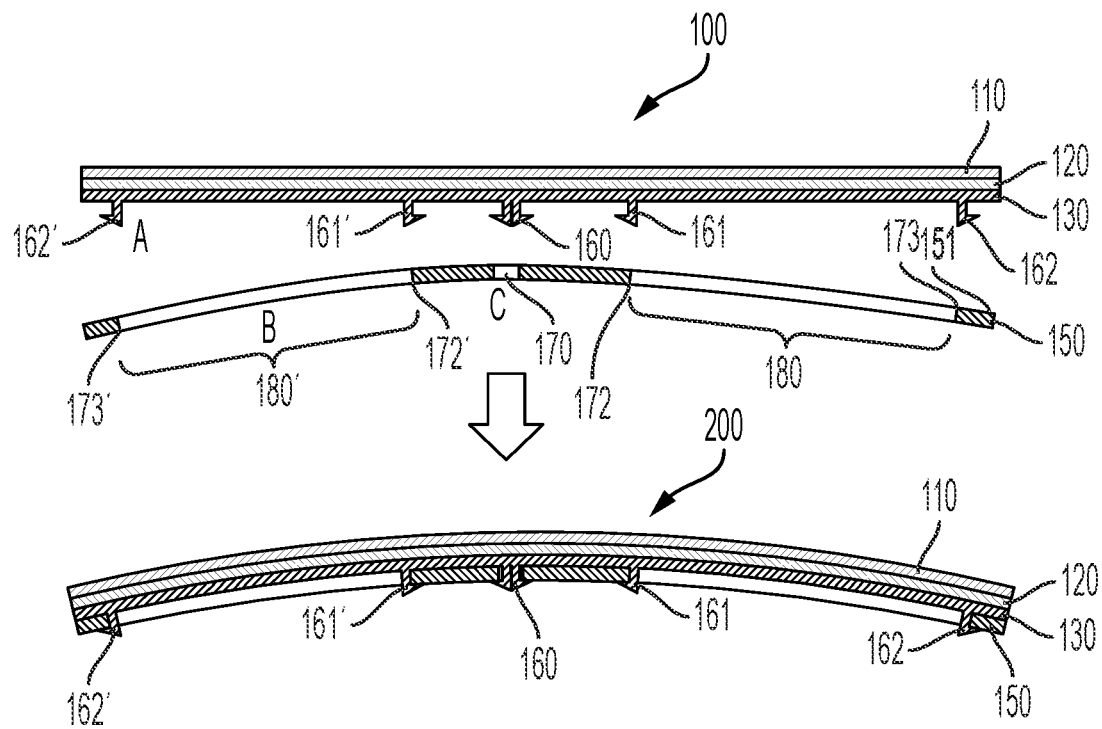
FIG. 1A is a side view of a glass construction according to the instant disclosure.

Repeated use of reference characters in the specification and drawings is intended to represent the same or analogous features or elements of the disclosure, even when the numbers increase by 100 from figure-to-figure. It should be understood that numerous other modifications and examples can be devised by those skilled in the art, which fall within the scope and spirit of the principles of the disclosure.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

This disclosure is generally directed to three-dimensional (3D) cold formed glass displays and methods for making the same. The methods described herein significantly simplify the manufacturing process for glass constructions for automobile interiors, among other applications, because they do not require adhesives that develop tack rapidly and cure quickly. Further, the methods described herein do not require clamping or mechanically restraining a glass construction for a time sufficient for the adhesive interlayer to provide sufficient tack and substantial creep resistance (e.g., partial or complete cure/curing of the adhesive layer/interlayer). The methods described herein not only simply the manufacturing process for glass construction, but also increase reliability of the glass construction because tension and/or shear are not introduced until after the adhesive interlayer is substantially cured.

The disclosure also generally relates to a frame construction comprising:
- a glass substrate having first and second major surfaces and at least one curvature; at least one connector layer including a plurality of mechanical restrains, the connector layer having third and fourth major surfaces;
- at least one adhesive layer located between the glass substrate second major surface and the connector layer third major surface; and
- a curved surface comprising a plurality of mechanical restrain receptacles engaging the plurality of mechanical restrains;
- wherein the curved surface defines the at least one curvature, the at least one curvature having a bend radius of about 60 mm or greater;
- wherein the engagement of the plurality of mechanical restrain receptacles and the plurality of mechanical restrains at least initially maintains the at least one curvature (e.g., a convex curve, a concave curve or combinations thereof). After cure, the adhesive layer can substantially maintains the at least one curvature.

The disclosure also relates to a frame construction comprising:
- a glass substrate having first and second major surfaces and at least one curvature;
- a segmented frame having fifth and sixth major surfaces and including at least one curved segment engaged with at least one substantially flat segment; and
- at least one adhesive layer located between at least a portion of the glass substrate second major surface and at least a portion of the segmented frame fifth major surface;
- wherein the at least one curved segment defines the at least one curvature, the at least one curvature having a bend radius of about 60 mm or greater;
- wherein the engagement of the at least one curved segment with the at least one substantially flat segment maintains the at least one curvature (e.g., a convex curve, a concave curve or combinations thereof). The segmented frame can include at least one curved segment comprising a first end a second end, the first end engaged with a first substantially flat segment and the second end engaged with a second substantially flat segment.

The disclosure also relates to a frame construction comprising:
- a glass substrate having first and second major surfaces and at least one curvature; at least one connector layer including a plurality of mechanical restraint receptacles, the connector layer having third and fourth major surfaces;
- at least one adhesive layer located between the glass substrate second major surface and the connector layer third major surface; and
- a curved surface comprising a plurality of mechanical restrains engaging the plurality of mechanical restrain receptacles;
- wherein the curved surface comprises a radius of curvature of about 60 mm or greater;
- wherein the engagement of the plurality of mechanical restraint receptacles and the plurality of mechanical restrains at least initially maintains the at least one curvature.

The methods described herein include first adhering a substantially flat glass component (e.g., a substantially flat sheet glass component) to a substantially flat, connector layer comprising a plurality of mechanical restraints located on a back side of the connector layer, on the side that faces away from and would be substantially invisible to a user. The connector layer can be flexible or un-flexible. For example, the connector layer can have a Young's modulus of from about less than 0.01 GPa to about 400 GPa, such as from less than about 0.01 GPa to about 1 GPa, about 0.1 GPa to about 5 GPa, about 5 GPa to about 100 GPa or about 50 GPa to about 200 GPa.

The glass component is adhered to the connector layer using any suitable adhesive, thereby producing a glass construction comprising a plurality of mechanical restraints. Once the adhesive develops sufficient tack and substantial creep resistance, the plurality of mechanical restrains on the glass construction can then be inserted into a corresponding plurality of mechanical restraint receptables located, e.g., on a curved surface of an automobile interior, thereby bending the glass construction to substantially match the shape of, e.g., a portion of an automobile interior. Alternatively, the plurality of mechanical restrains on the glass construction can be inserted into a corresponding plurality of mechanical restraint receptables located on a flexible frame that can then be fastened, e.g., on a curved surface of an automobile interior.

The methods described herein also include first adhering a substantially flat glass component (e.g., a substantially flat sheet glass component) to a substantially flat, connector layer comprising a plurality of mechanical restraint receptables on a back side of the connector layer, on the side that faces away from and would be substantially invisible to a user. The glass component is adhered to the connector layer using any suitable adhesive, thereby producing a glass construction comprising a plurality of mechanical restraint receptables. Once the adhesive develops sufficient tack and substantial creep resistance, the plurality of mechanical restraint receptables on the glass construction can be engaged with a corresponding plurality of mechanical restraints located, e.g., on a curved surface of an automobile interior, thereby bending the glass construction to substantially match the shape of, e.g., a portion of an automobile interior.

An example of a glass construction 100 is shown in FIG. 1A, which forms glass construction 200 upon engagement with frame 150. Glass construction 100/200 includes a glass substrate 110, an adhesive interlayer 120, and a connector layer 130. Connector layer 130, in turn, includes a plurality of mechanical restrains 160, 161, 161', 162, and 162'. The mechanical restraints can insert into a plurality of mechanical restrain receptacles 170, 172, 172', 173, and 173', respectively, located in frame 150. In the embodiment shown, frame 150 comprises a curved surface 151.

Figure 1B:
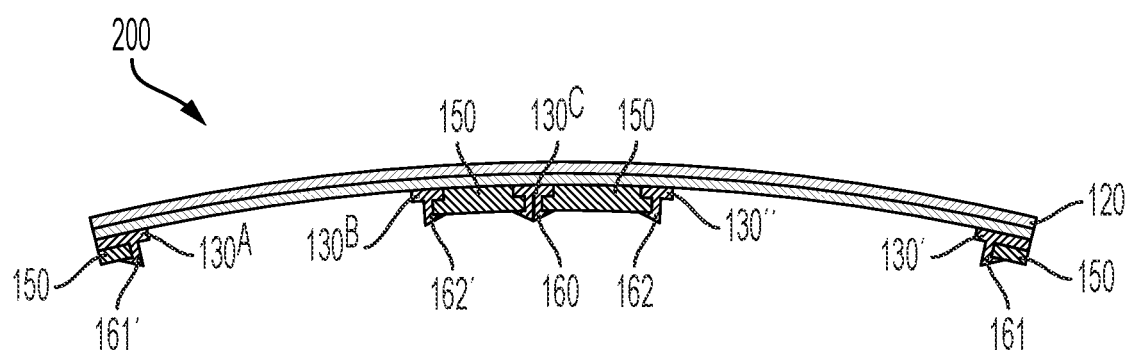
FIG. 1B is a side view of a glass construction according to the instant disclosure.

Although glass construction 100/200 can include a connector layer that extends substantially the entire length of glass substrate 110 and adhesive interlayer 120, segmented connector layers are contemplated herein (see FIG. 1B), wherein, e.g., mechanical restraint 161 and 162 would be located on a first connector layer 130' and second connector layer 130", respectively; mechanical restraints 161' and 162' would be located on a third connector layer 130$^A$ and fourth connector layer 130$^B$; and mechanical restraint 160 would be located on a fifth connector layer 130. Such segmented connector layers can be flexible. Or such segmented connector layers can be non-flexible.

Figure 1C:
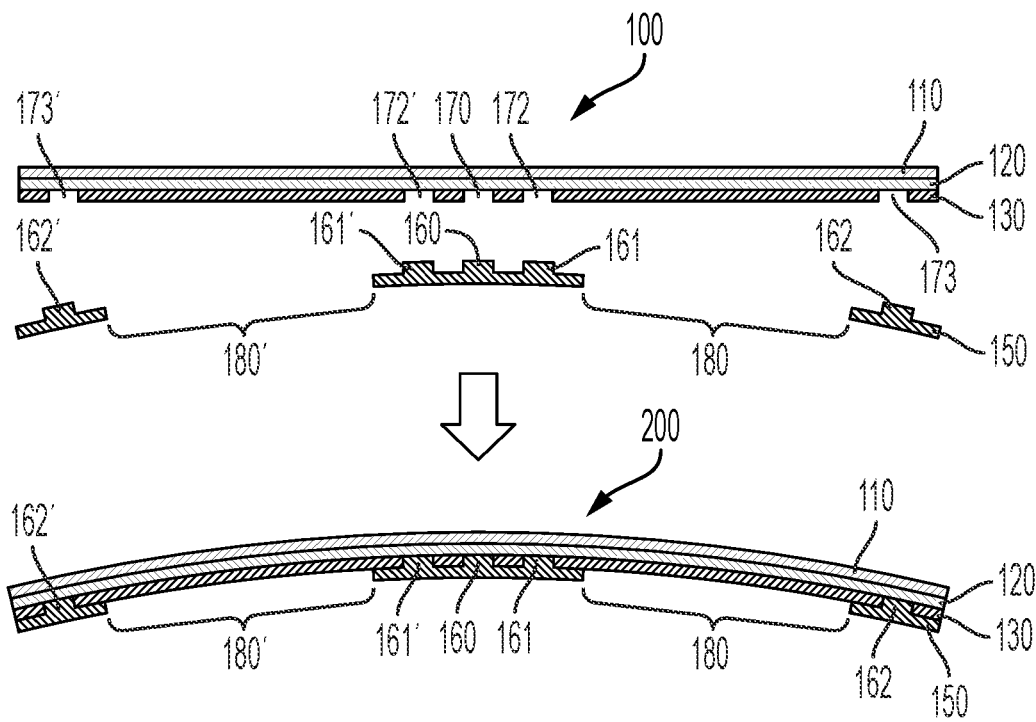
FIG. 1C is a side view of a glass construction according to the instant disclosure.
Figure 1D:
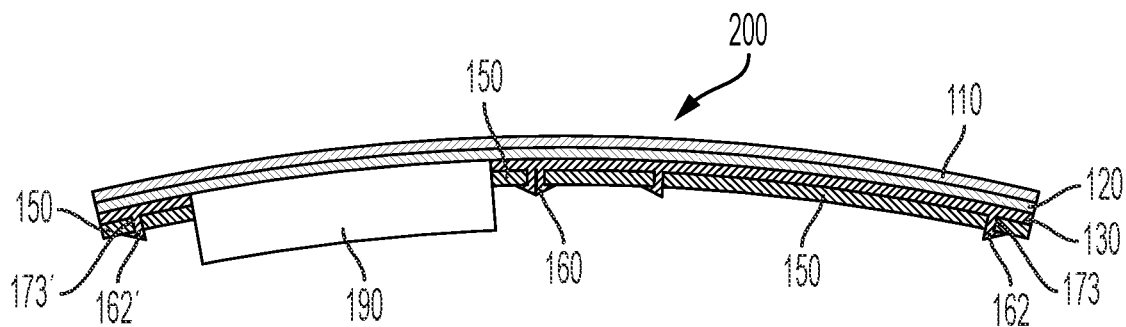
FIG. 1D is a side view of a glass construction according to the instant disclosure.

In other examples, connector layer 130, 130', 130", or 130''' can comprise features to make it anisotropically bend to drive dimensional bending and minimize warp in glass substrate 110. Features that can allow the connector layer to anisotropically bend to drive dimensional bending and minimize warm in glass substrate 110 include various patterns (e.g., linear patterns) 101 in the connector layer, wherein the patterns have an axis that is orthogonal to a bend axis 102 in the glass construction 100. See FIG. 1E. An example of such a pattern is shown in FIGS. 1E-1G, wherein FIG. 1E is a perspective view of a glass construction 100 similar to the one shown in FIG. 1A, FIG. 1F is a bottom view of a patterned connector layer 130, and FIG. 1G is a perspective view of the patterned connector layer shown in FIG. 1F.

Figure 1E:
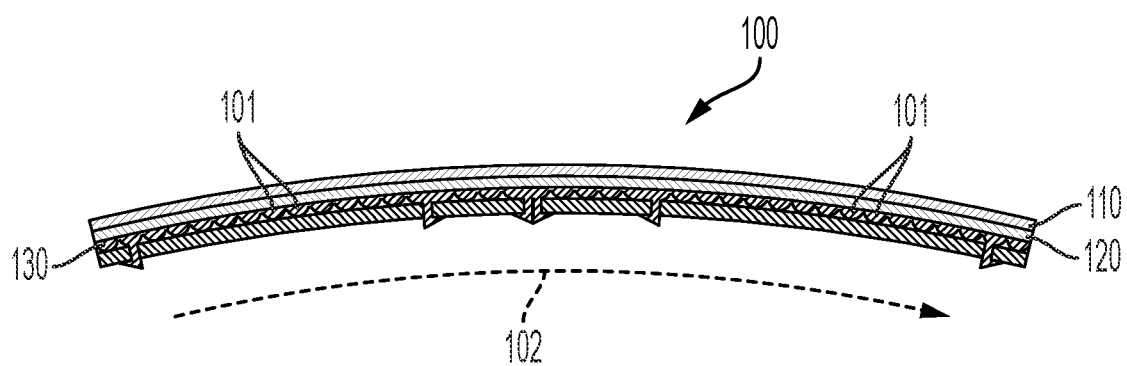
FIG. 1E is a perspective view of a glass construction according to the instant disclosure.
Figure 1F:
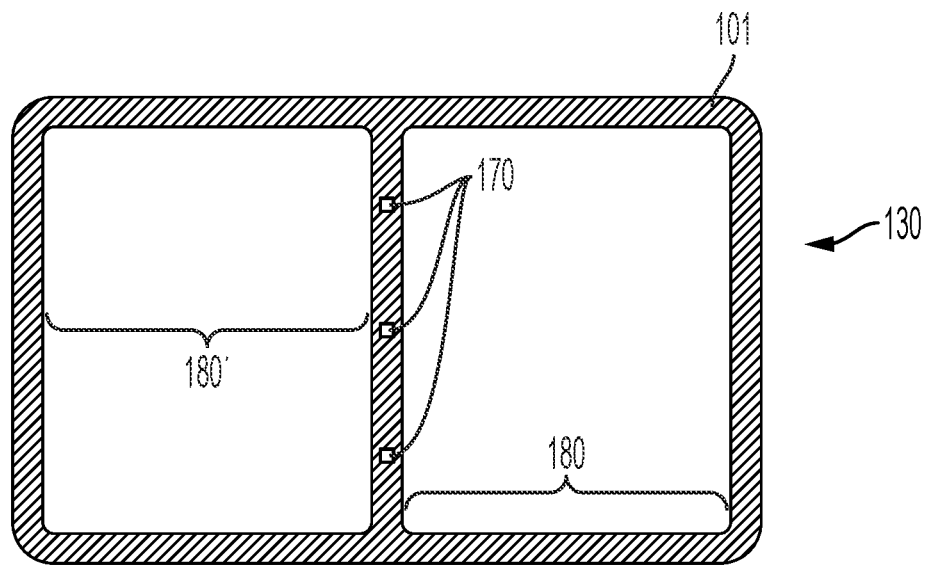
FIG. 1F is a bottom view of a patterned connector layer according to the instant disclosure.
Figure 1G:
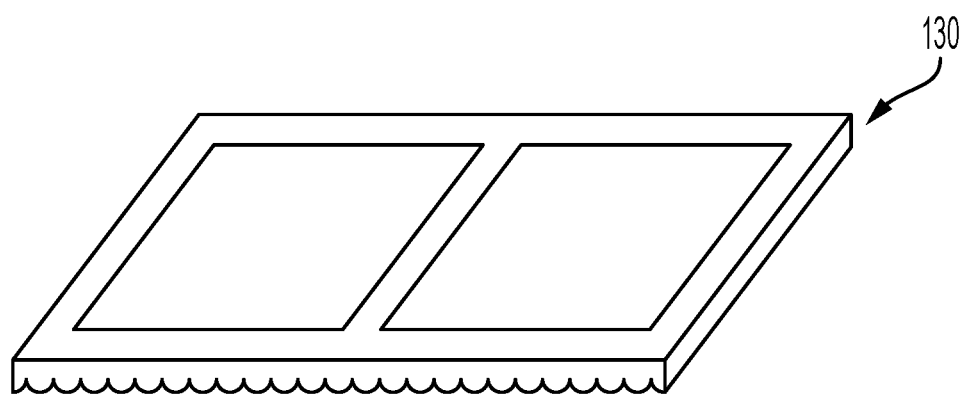
FIG. 1G is a perspective view of the patterned connector layer shown in FIG. 1F according to the instant disclosure.

The pattern shown in FIG. 1E appear exaggerated to illustrate the presence of a pattern. But the pattern can be a microreplicated pattern or a pattern applied to the connector layer by embossing the connector layer using any suitable method known in the art for generating microreplicated and embossed patterns. Or the pattern can be created by using any suitable method known in the art.

In the example provided in FIG. 1A, at least receptacles 172, 172', 173, and 173' are defined by edges of frame gaps 180 and 180' present in frame 150. FIG. 1A not only shows glass construction 100, and its parts, but also how glass construction 100 engages mechanical restrain receptacles 170, 172, 172', 172', and 173' in frame 150 to form frame construction 200. Frame 150 in frame construction 200 is sufficiently rigid to impose its shape on glass construction 100.

Although the shape provided in FIG. 1A is curvilinear, frame 150 (and the other frames described herein) can impart any suitable shape on the glass substrate including an S-shape, C-shape, a J-shape, an S-shape, or a V-shape. In some instances, the frames described herein can be complexly curved and can have a distinct radius of curvature in at least two different regions (e.g., as in a windshield) or in at least two independent directions, which may be the same or different radii from one another.

FIG. 1C shows another example of a glass construction 100, which forms glass construction 200 upon engagement with frame 150. In FIG. 1C however, the frame 150, not the connector layer 130, is what includes a plurality of mechanical restrains 160, 161, 161', 162, and 162'. The mechanical restraints can insert into a plurality of mechanical restrain receptacles 170, 172, 172', 173, and 173', respectively, located in connector layer 130.

FIG. 1D shows another example of a glass construction 200. FIG. 1D can have any of the configurations of connector layer 130 and frame 150 described herein. But the glass construction 200 shown in FIG. 1D effectively shows the construction in FIG. 1A, with a display 190 mounted thereon. The constructions (e.g., 100 and 200) allow for the mounting (e.g. adhesion) of a display or other device onto glass construction 100 from, e.g., FIGS. 1A and 1C, while the glass construction 100 is flat. Once the adhesive layer develops sufficient tack and creep resistance, the construction 100 can be engaged with the frame 150 to form construction 200 with the display thereon. One should recognize that the display could also be mounted, e.g., onto the constructions 200 shown in FIGS. 1A-1C, following engagement of glass construction 100 with frame 150.

Figure 2:
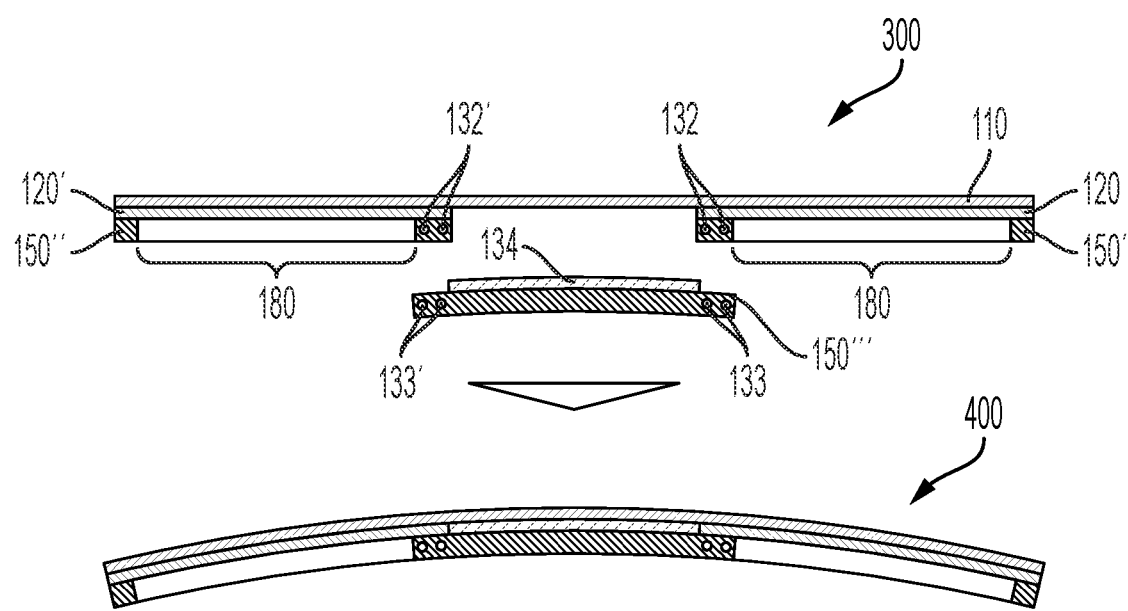
FIG. 2 is a side view of another glass construction according to the instant disclosure.

In any of the constructions shown herein (e.g., FIGS. 1A-1C), the frame need not be monolithic and can be segmented as shown in FIG. 2. FIG. 2 is a side view of a segmented frame where the frame is, in this example, segmented into three parts, namely, 150', 150", and 150'. Frame 150' comprises a plurality of holes 132; frame 150" comprises a plurality of holes 132'; and frame 150" comprises a plurality of holes 133 and 133'. Even though a plurality of holes 132 is shown, frame 150' could have a single hole. Further, even though a plurality of holes 132' is shown, frame 150" could have a single hole. Finally, even though a plurality of holes 133 and 133' is shown, frame 150''' could have a single hole 133 or a single hole 133'.

Frame 150''' is configured such that, when glass substrate 110 is curved, the plurality of holes 133 can line up with the plurality of holes 132 and the plurality of holes 133' can line up with the plurality of holes 132'. Frame 150''' can then be fastened to frames 150' and 150" by inserting, e.g., pins, rods or bolts into the plurality holes 132 and 132', such that the pins, rods or bolts would extend through or into the plurality of holes 133 and the plurality of holes 133', thereby maintaining the shape, in this example a curve shaped, of glass substrate 110 in frame construction 400. Frame construction 400 can optionally have an adhesive 134 such that the entire construction is adhesive backed.

Frames 150, 150', 150", and 150''' can have any suitable thickness. In some examples, the thickness of a frame can vary within the same frame. In other examples, such as the example shown in FIG. 2, frames 150' and 150" can be the same thickness, but frame 150''' can be a different thickness than either frame 150' or frame 150". The frames described herein can have a thickness that can be in a range from about 0.5 mm to about 20 mm; and all ranges and sub-ranges therebetween.

Frames 150, 150', 150", and 150''' can be made of any suitable material, including any material that is sufficiently rigid to impose its shape on glass construction 100. That is not to say, however, that frame 150 or 150' cannot deform slightly from its shape once glass construction 110 is mounted or fastened thereon. In some examples, frames 150, 150', 150", and 150''' can be metal, made of aluminum, magnesium alloy, stainless steel or combinations thereof, and forms a curved metal frame. But other materials are contemplated herein for frames 150, 150', 150", and 150''', including carbon fiber and plastics that would be sufficiently rigid to impose its shape on glass construction 100 and 300.

Figure 3A:
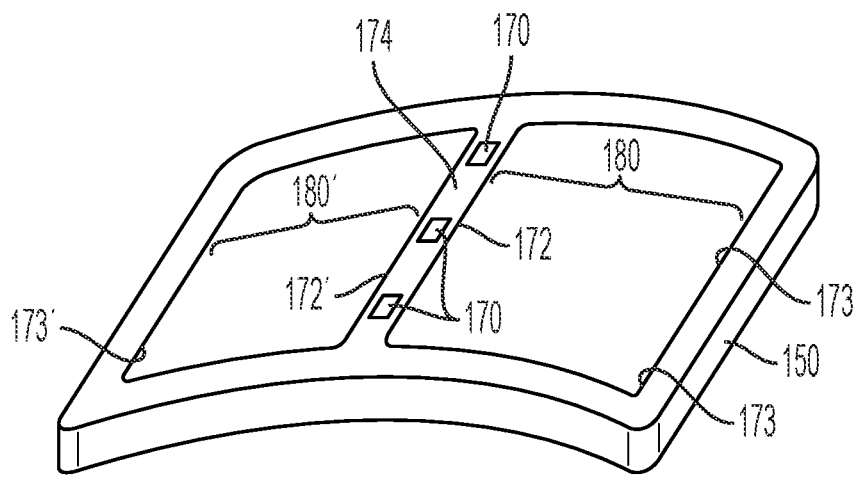
FIG. 3A is a perspective view of a frame according to the instant disclosure.

FIG. 3A is a perspective view of frame 150 in FIG. 1A showing mechanical restrain receptacles 170, 172, 172', 173, and 173', respectively. It is clear from FIG. 3A that frame 150 can have a plurality of mechanical restrain receptacles 170 located along frame midsection 174 into which a plurality of mechanical restraints 160 can insert and engage the plurality of mechanical restraint receptacles 170. Although mechanical restraint receptacles 170 are located along the same axis, they need not be. FIG. 3A also shows mechanical restraint receptacles 172, 172' and 173, 173' formed by edges on frame 200 that can be engaged by mechanical restrains 161,161' and 162,162'. In the example provided in FIG. 3A, at least receptacles 172, 172', 173, and 173' are defined by edges of frame gaps 180 and 180' present in frame 150.

Figure 3B:
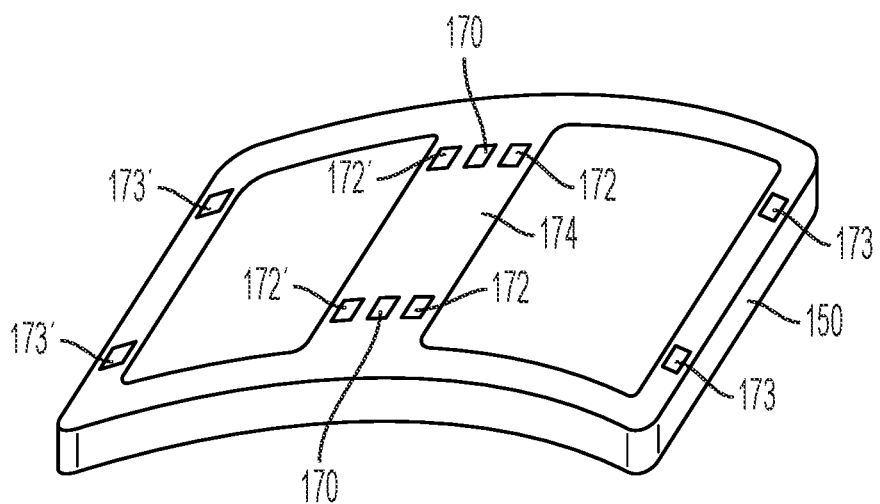
FIG. 3B is a perspective view of a frame according to the instant disclosure.

FIG. 3B is a perspective view of frame 150 in FIG. 1A showing mechanical restrain receptacles 170, 172, 172', 173, and 173', respectively. It is clear from FIG. 3B that frame 150 can have a plurality of mechanical restrain receptacles 170 located along frame midsection 174 into which a plurality of mechanical restraints 160 can insert and engage the plurality of mechanical restraint receptacles 170. Although mechanical restraint receptacles 170 are located along the same axis, they need not be. FIG. 3B also shows mechanical restraint receptacles 172, 172' and 173, 173' that, in this case, would surround engaged mechanical restrains 161,161' and 162,162'.

Figure 3C:
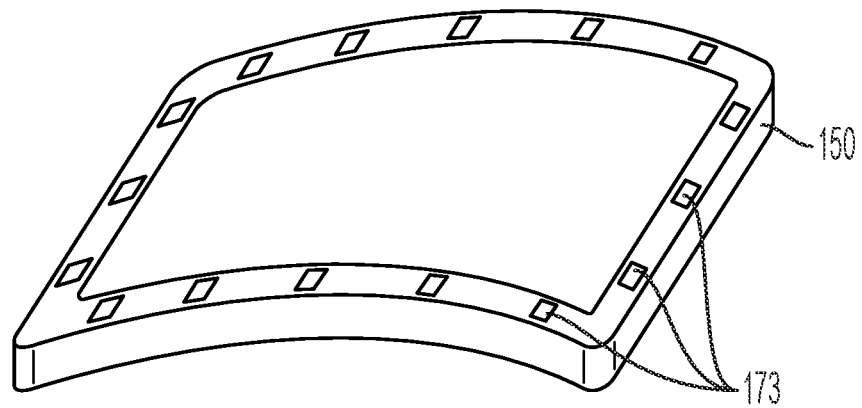
FIG. 3C is a perspective view of a frame according to the instant disclosure.

FIG. 3C is a perspective view of frame 150 showing mechanical restrain receptacles 173 into which a plurality of mechanical restraints 160 can insert and engage the plurality of mechanical restraint receptacles 173. In the example given in FIG. 3C, there is no frame midsection 174 and the receptables 173 are located about the perimeter of frame 150.

Figure 4:
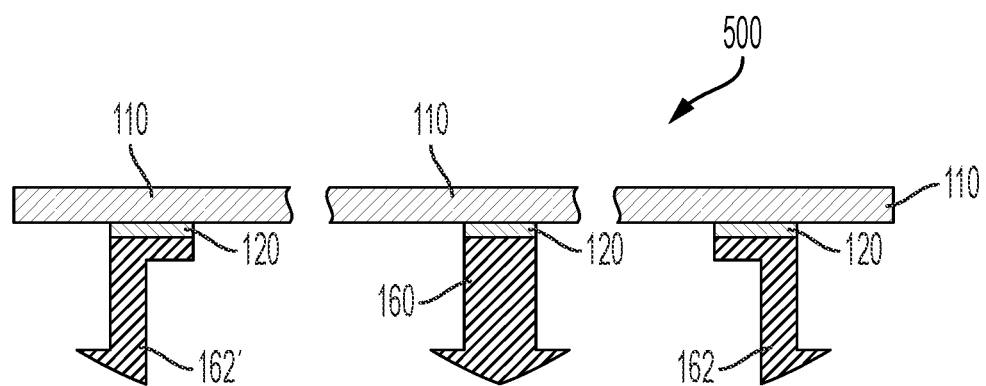
FIG. 4 is a partial side view of glass construction according to the instant disclosure.

FIG. 4 is a partial side view of glass construction 500 in FIG. 1A including a glass substrate 110 and an adhesive interlayer 120, but has a segmented connector layer 130, segmented to such an extent that glass construction 500, which could be used to form a glass construction similar to glass construction 200, comprise substantially only a plurality of mechanical restrains 160, 162, and 162' directly adhered to glass substrate 110 via adhesive layer 120.

The mechanical restraints described herein can have any suitable shape that would allow them to engage the plurality of mechanical restraint receptacles. In other words, even though arrow-shaped mechanical restraints are shown in FIG. 1A and FIG. 4, the mechanical restraints can have any suitable shape. And although mechanical restraints 160, 162, and 162', as well as mechanical restraints 161 and 161', are shown in a snap-fit configuration, there are no limitations as to how mechanical restrains 160, 161, 161', 162, and 162' can engage mechanical restrain receptacles 170, 172, 172', 173, and 173'. For example, mechanical restrains 160, 161, 161', 162, and 162' can engage mechanical restrain receptacles 170, 172, 172', 173, and 173' by interference fit, snap fit, and combinations thereof. In some instances, in fact, mechanical restrains 160, 161, 161', 162, and 162' could be threaded and could extend through receptacles 170, 172, 172', 173, and 173' and could be held to form frame construction using, e.g., a nut. In addition, the mechanical restrains 160, 161, 161', 162, and 162' can engage mechanical restrain receptacles 170, 172, 172', 173, and 173' using heat-staking, where a plastic restraint material can be melted or welded to frame 150.

Figure 5:
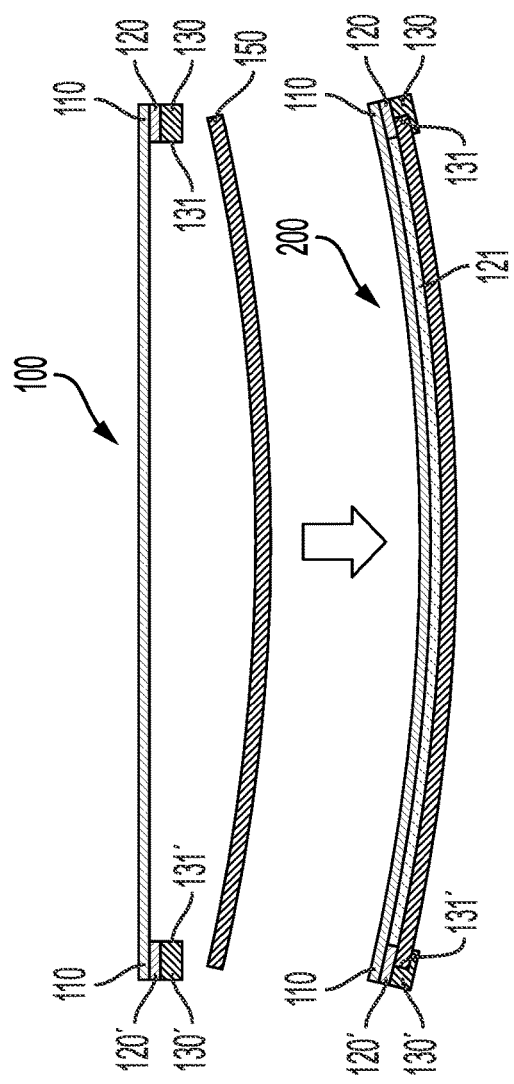
FIG. 5 is a side view of another glass construction according to the instant disclosure.
Figure 6:
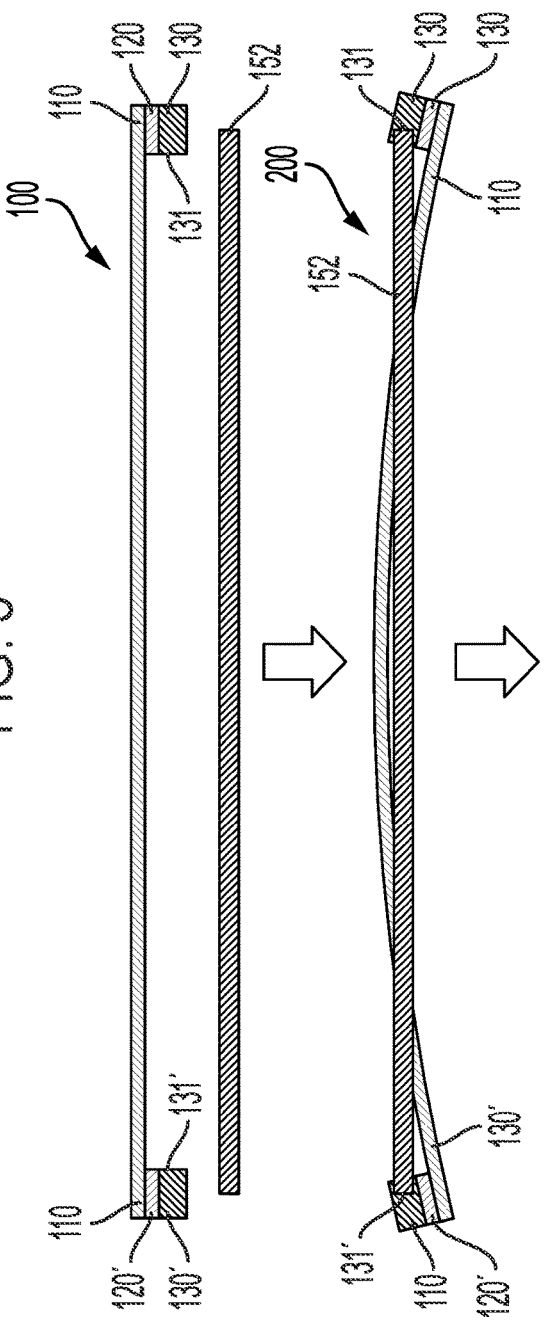
FIG. 6 is a side view of another glass construction according to the instant disclosure.

FIGS. 5 and 6 are additional glass constructions 100 contemplated herein, wherein connector layer 130 can be segmented.

Glass construction 100 is shown in FIG. 5, which forms glass construction 200 upon engagement with frame 150 and, in the case of the construction shown in FIG. 5, also upon engagement with a suitable vacuum chuck and a suitable second adhesive layer (e.g., the adhesives described herein) 121, where the vacuum chuck causes glass construction 100 to deform and contact frame 150. The frame 150, the glass construction 100 or both the frame 150 and the glass construction 100 can comprise a second adhesive layer 121 before glass construction 200 is formed. Glass construction 100/200 includes a glass substrate 110, adhesive layers 120 and 120' and connector layers 130 and 130', wherein connector layers 130 and 130' include mechanical restraint receptacles 131 and 131', which engage frame 150 as shown.

Other configurations for connector layers 130 and 131' are contemplated herein. For example, the mechanical restraint receptacles 131 and 131' can comprise threads to each accept a screw that would insert through a hole in frame 150. In sum, any of the mechanical restraint receptacle/mechanical restraint configurations described herein apply equally to FIG. 5. Further, second adhesive layer 121 can assist in maintaining the at least one curvature or can entirely maintain the at least one curvature, independent of mechanical restraint receptacles 131/131' engaged with frame 150, such that the connector layers 130/130', including mechanical restraint receptacles 131/131', could be removed, if desired.

Another glass construction 100 is shown in FIG. 6, which forms glass construction 200 upon engagement with frame 150. Glass construction 100/200 includes a glass substrate 110, adhesive layers 120 and 120' and connector layers 130 and 130', wherein connector layers 130 and 130' include mechanical restraint receptacles 131 and 131', which engage uncurved surface 152 as shown.

Other configurations for connector layers 130 and 131' are contemplated herein. For example, the mechanical restraint receptacles 131 and 131' can comprise threads to each accept a screw that would insert through a hole in uncurved surface 152. In sum, any of the mechanical restraint receptacle/ mechanical restraint configurations described herein apply equally to FIG. 6. Further, as indicated in FIG. 6, one can laminate a display to construction 200 using any suitable method known in the art. In addition, or alternatively, one can apply a second adhesive layer (not shown) to at least a portion of the concave or convex surface of glass substrate 110, where the second adhesive layer can engage a curved surface 151. The curved surface 151 itself can include a third adhesive layer. Once the second adhesive layer (and third adhesive layer, if present) cures, the second adhesive layer (and third adhesive layer, if present) can entirely maintain the at least one curvature. At that point, uncurved surface 152 can be removed. Further still, glass construction 100/ 200 can include additional mechanical restraint receptacles (not shown), which engage the curved surface 151 such that the additional mechanical restraint receptacles can assist in maintaining the at least one curvature.

As used herein, the term "glass substrate" is used in its broadest sense to include any object made wholly or partly of glass. Glass substrates include laminates of glass and non-glass materials, laminates of glass and crystalline materials, and glass-ceramics (including an amorphous phase and a crystalline phase). The glass substrates may be transparent or opaque and can optionally include a colorant that provides a specific color. The glass substrates described herein can be cold formed.

As used herein, the terms "cold-formed," "cold-bent," or "cold-bending" refers to curving the glass substrates described herein at a cold-forming temperature which is less than the softening point of the glass substrate. The term "cold-bendable" refers to the capability of a glass substrate to be cold-bent to any given radius of curvature.

Suitable glass substrates for use herein include, but are not limited to, soda lime silicate, aluminosilicate, borosilicate, boroaluminosilicate, alkali-containing aluminosilicate, alkali-containing borosilicate, and alkali-containing boroaluminosilicate. Also included are laminates.

The glass substrates can be strengthened using any suitable method known in the art, including by including compressive stress (CS) into the glass substrate, that extends from a surface to a depth of compression (DOC); by utilizing a mismatch of the coefficient of thermal expansion between portions of the glass substrate to create a compressive stress region and a central region exhibiting a tensile stress; thermally by heating the glass substrate to a temperature above the glass transition point and then rapidly quenching; and chemically by ion exchange, where, e.g., ions at or near the surface of the glass substrate are replaced by, or exchanged with, larger ions having the same valence or oxidation state.

The thickness of the glass substrates can be tailored to allow the glass substrate to be more flexible to achieve the desired radius of curvature. The thickness of the glass substrate can be substantially constant along its length. The glass substrate can have any suitable thickness, of about 0.2 mm to about 3 mm (e.g., about 0.2 mm to about 2 mm and about 0.4 mm to about 1.1 mm). Further, the glass substrate, once incorporated into, e.g., glass constructions 200 and 400, can have any suitable bending radius, or radius of curvature. The radius of curvature can be, for example, about 20 mm or greater, 40 mm or greater, 50 mm or greater, 60 mm or greater, 100 mm or greater, 250 mm or greater or 500 mm or greater. For example, the radius of curvature can be in a range from about 60 mm to about 1200 mm. Further still, the glass substrate can have any suitable width, e.g., in a range from about 5 cm to about 250 cm; and any suitable length, e.g., in a range from about 5 cm to about 250 cm.

The adhesive layer 120 can have any suitable bond line, which is defined by at least one of the adhesive's thickness and bezel width. For example, the adhesive can have a thickness of about 5 mm or less, such as from about 200 μm to about 1 mm. The adhesive layer 120 can also have any suitable bezel width. For example, can have a bezel width of about 50 mm or less, such as 25 mm or less, such as in a range from about 1 mm to about 15 mm.

Suitable adhesives include 2-part Toughened Epoxy (for example, Master Bond EP21TDCHT-LO, 3M Scotch Weld Epoxy DP460 Off-white); Flexible Epoxy (for example, Master Bond EP21TDC-2LO, 3M Scotch Weld Epoxy 2216, 3M Scotch Weld Epoxy DP125, DP105, DP100+, Epoxy 2216 available from 3M®, Saint Paul, MN); Toughened Acrylics (for example, LORD Adhesive 403, 406 or 410 Acrylic adhesives with LORD Accelerator 19 or 19 GB w/LORD AP 134 primer, LORD Adhesive 850 or 852/ LORD Accelerator 25 GB, Loctite HF8000, Loctite AA4800); polyurethanes such as 3M Scotch Weld DP640, DP604NS, DP620NS available from 3M®, Saint Paul, MN, Loctite HHD 3542, Betamate 73100/002, 73100/005, 73100/010, Betaseal X2500, and Betalink K2, from Dupont®, Wilmington, DE; silane modified polymers such as TEROSON RB IX, also known as TEROSTAT MS 9399, Teroson MS 930/Teroson MS 9371 and TEROSON MS 647, available from Loctite® and VIASeal XB; silicones or siloxanes, such as Dow Corning 7091, 995 Silicone, Dow Corning HM-2600 Assembly sealant, Dow Corning HM-2500 Assembly sealant, 121 Structural Glazing Sealant as well as other organo-functional siloxanes.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The present disclosure provides for the following embodiments, the numbering of which is not to be construed as designating levels of importance:

Embodiment 1 relates to a frame construction comprising:
- a glass substrate having first and second major surfaces and at least one curvature;
- at least one connector layer including a plurality of mechanical restrains, the connector layer having third and fourth major surfaces;
- at least one adhesive layer located between the glass substrate second major surface and the connector layer third major surface; a frame comprising a plurality of mechanical restrain receptacles engaging the plurality of mechanical restrains;
- wherein the frame comprises a curved surface that comprises a radius of curvature of about 60 mm or greater;
- wherein the engagement of the plurality of mechanical restrain receptacles and the plurality of mechanical restrains at least initially maintains the at least one curvature of the glass substrate.

Embodiment 2 relates to the construction of Embodiment 1, wherein the connector layer is flexible.

Embodiment 3 relates to the construction of Embodiment 1 or Embodiment 2, further comprising a second adhesive layer located between the glass substrate second major surface and the curved surface of the frame.

Embodiment 4 relates to the construction of any one of Embodiments 1 through 3, wherein the connector layer is segmented.

Embodiment 5 relates to the construction of any one of Embodiments 1 through 4, wherein the connector layer is bonded to the glass substrate in a minimum number of locations on the glass substrate sufficient to at least initially maintain the at least one curvature of the glass substrate.

Embodiment 6 relates to the construction of Embodiment 5, wherein the connector layer is segmented to such an extent that the connector layer comprises substantially only a plurality of mechanical restrains adhered to the glass substrate.

Embodiment 7 relates to the construction of any one of Embodiments 1 through 6, wherein the radius of curvature of the curved surface is from about 60 mm to about 10,000 mm.

Embodiment 8 relates to the construction of any one of Embodiments 1 through 7, wherein the glass substrate comprises a composition selected from the group consisting of soda lime silicate, aluminosilicate, borosilicate, boroaluminosilicate, alkali-containing aluminosilicate, alkali-containing borosilicate, and alkali-containing boroaluminosilicate.

Embodiment 9 relates to the construction of any one of Embodiments 1 through 8, wherein the glass substrate has a thickness measured from the first major surface to the second major surface of about 0.2 mm to about 2 mm.

Embodiment 10 relates to the construction of any one of Embodiments 1 through 9, wherein the curved surface is a metal curved surface.

Embodiment 11 relates to the construction of Embodiment 10, wherein the curved metal frame is formed of aluminum, magnesium alloy, stainless steel or combinations thereof.

Embodiment 12 relates to the construction of any one of Embodiments 1 through 11, wherein the at least one adhesive layer comprises an epoxy, a polyurethane, an acrylate, a silane modified polymer or a silicone.

Embodiment 13 relates to the construction of Embodiment 1, wherein the adhesive layer has a thickness in a range from about 200 µm to about 5 mm.

Embodiment 14 relates to a frame construction comprising:
 a glass substrate having first and second major surfaces and at least one curvature;
 a segmented frame having first and second opposing major surfaces and including at least one curved segment engaged and at least one substantially flat segment; and
 at least one adhesive layer located between at least a portion of the glass substrate second major surface and at least a portion of the segmented frame first major surface;
 wherein the at least one curved segment comprises a curved surface, having a bend radius of about 60 mm or greater;
 wherein the engagement of the at least one curved segment with the at least one substantially flat segment maintains the at least one curvature of the glass substrate.

Embodiment 15 relates to the construction of Embodiment 14, wherein the at least one curved segment comprises a first end a second end, wherein the first end engages with a first substantially flat segment and the second end engaged with a second substantially flat segment.

Embodiment 16 relates to the construction of Embodiment 14 or Embodiment 15, further comprising a second adhesive layer located between the glass substrate second major surface and the curved surface of the frame.

Embodiment 17 relates to the construction of any one of Embodiments 14 through 16, wherein the radius of curvature of the curved surface is from about 60 mm to about 10,000 mm.

Embodiment 18 relates to the construction of any one of Embodiments 14 through 17, wherein the glass substrate comprises a composition selected from the group consisting of soda lime silicate, aluminosilicate, borosilicate, boroaluminosilicate, alkali-containing aluminosilicate, alkali-containing borosilicate, and alkali-containing boroaluminosilicate.

Embodiment 19 relates to the construction of any one of Embodiments 14 through 18, wherein the glass substrate has a thickness measured from the first major surface to the second major surface of about 0.2 mm to about 2 mm.

Embodiment 20 relates to the construction of any one of Embodiments 14 through 19, wherein the curved surface is a metal curved surface.

Embodiment 21 relates to the construction of Embodiment 20, wherein the curved metal frame is formed of aluminum, magnesium alloy, stainless steel or combinations thereof.

Embodiment 22 relates to the construction of any one of Embodiments 14 through 21, wherein the at least one adhesive layer comprises an epoxy, a polyurethane, an acrylate, a silane modified polymer or a silicone.

Embodiment 23 relates to the construction of any one of Embodiments 14 through 22, wherein the adhesive layer has a thickness in a range from about 200 µm to about 5 mm.

What is claimed is:

1. A glass article comprising:
 a glass substrate comprising a first major surface and a second major surface;
 a connector layer;
 an adhesive layer disposed between the second major surface and the connector layer, wherein the adhesive comprises a thickness that is greater than or equal to 200 µm and less than or equal to 1 mm and a bezel width that is greater than or equal to 1 mm and less than or equal to 15 mm; and
 a frame configured to impose a shape onto the glass substrate and the connector layer via a rigidity of the frame, wherein:
  one of the connector layer and the frame comprises a plurality of mechanical restraints,
  the other one of the connector layer and the frame comprises a plurality of mechanical restraint receptacles engaging the plurality of mechanical restraints, and
  the engagement of the plurality of mechanical restraint receptacles and the plurality of mechanical restraints maintains the glass substrate and connector layer in a curved shape when the glass substrate is mechanically stressed.

2. The glass article of claim 1, wherein the plurality of mechanical restraints extend from the connector layer and are inserted into mechanical restraint receptacles associated with the frame.

3. The glass article of claim 2, wherein, as a result of being maintained in the curved shape by the engagement of the plurality of mechanical restraint receptacles and the plurality of mechanical restraints, the glass substrate and connector layer are bent into conformity with a curved surface of the frame, where the curved surface comprises a radius of curvature that is greater than or equal to 60 mm and less than or equal to 10,000 mm.

4. The glass article of claim 2, wherein the frame comprises a frame gap extending through an entirety thereof.

5. The glass article of claim 4, further comprising a display disposed in the frame gap.

6. The glass article of claim 4, wherein at least some of the plurality of mechanical restraint receptacles are defined by edges of the frame gap.

7. The glass article of claim 4, wherein the plurality of mechanical restraint receptacles are located around a perimeter of the frame gap.

8. The glass article of claim 4, wherein the frame comprises an additional frame gap extending through an entirety thereof and a frame midsection disposed between the frame gap and the additional frame gap, wherein one or more of the plurality of mechanical restraint receptacles are disposed in the frame midsection.

9. The glass article of claim 8, wherein the one or more of the plurality of mechanical restraint receptacles that are disposed in the frame midsection comprise a grouping of mechanical restraint receptacles disposed along a common axis.

10. The glass article of claim 9, wherein the common axis extends perpendicular to the frame midsection from the frame gap to the additional frame gap.

11. The glass article of claim 1, wherein the connector layer comprises a plurality of separate connector layer segments, each of the connector layer segments comprising one of the plurality of mechanical restraints and adhered to the glass substrate.

12. The glass article of claim 1, wherein the plurality of mechanical restraints and the plurality of mechanical restraint receptacles are configured to engage via a snap fit configuration, a threaded configuration, or a welded configuration.

13. The glass article of claim 1, wherein the plurality of mechanical restraints extend from the frame and are inserted into mechanical restraint receptacles associated with the connector layer.

14. The glass article of claim 1, wherein the frame is formed of a metal, carbon fiber, plastic, or a combination thereof.

15. The glass article of claim 14, wherein the frame comprises a thickness that is greater than or equal to 0.5 mm and less than or equal to 20 mm.

16. The glass article of claim 1, wherein the frame is uncurved and engages with mechanical restrain receptacles of the connector layer to retain the glass substrate in the curved shape.

17. The glass article of claim 16, wherein the plurality of mechanical restraints comprise portions of a body of the frame that engage with mechanical restraint receptacles in the connector layer.

18. The glass article of claim 1, wherein the connector layer comprises a Young's modulus that is greater than or equal to 0.01 GPa and less than or equal to 400 GPa.

19. A glass article comprising:
a glass substrate comprising a first major surface and a second major surface;
a connector layer;
an adhesive layer disposed between the second major surface and the connector layer; and
a frame configured to impose a shape onto the glass substrate and the connector layer via a rigidity of the frame, wherein:
the frame comprises a thickness that is greater than or equal to 0.5 mm and less than or equal to 20 mm,
the frame comprises a curved surface that is complexly curved with distinct radii of curvature in at least two regions or in at least two independent directions,
one of the connector layer and the frame comprises a plurality of mechanical restraints,
the other one of the connector layer and the frame comprises a plurality of mechanical restraint receptacles engaging the plurality of mechanical restraints,
the engagement of the plurality of mechanical restraint receptacles and the plurality of mechanical restraints maintains the glass substrate and connector layer in a curved shape when the glass substrate is mechanically stressed, and
as a result of being maintained in the curved shape by the engagement of the plurality of mechanical restraint receptacles and the plurality of mechanical restraints, the glass substrate and connector layer are bent into conformity with the curved surface of the frame.

20. The glass article of claim 19, wherein at least one of the frame and the connector layer is segmented.

* * * * *